US011405110B2

(12) United States Patent
Kawai

(10) Patent No.: US 11,405,110 B2
(45) Date of Patent: Aug. 2, 2022

(54) OPTICAL REPEATER AND OPTICAL SIGNAL RELAY METHOD

(71) Applicant: NEC Corporation, Tokyo (JP)

(72) Inventor: Motoyoshi Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/284,008

(22) PCT Filed: Oct. 4, 2019

(86) PCT No.: PCT/JP2019/039294
§ 371 (c)(1),
(2) Date: Apr. 9, 2021

(87) PCT Pub. No.: WO2020/080144
PCT Pub. Date: Apr. 23, 2020

(65) Prior Publication Data
US 2021/0384978 A1 Dec. 9, 2021

(30) Foreign Application Priority Data

Oct. 18, 2018 (JP) .............................. JP2018-196827

(51) Int. Cl.
H04B 10/297 (2013.01)
H04B 10/25 (2013.01)
(52) U.S. Cl.
CPC ... H04B 10/2972 (2013.01); H04B 10/25891 (2020.05)
(58) Field of Classification Search
None
See application file for complete search history.

(56) References Cited

U.S. PATENT DOCUMENTS 6,327,077 B1* 12/2001 Okazaki .............. H01S 3/09415
359/341.3
6,798,567 B2* 9/2004 Feldman .............. H04B 10/296
359/341.42

(Continued)

FOREIGN PATENT DOCUMENTS

JP H11243369 A 9/1999
JP 2002221742 A 8/2002

(Continued)

OTHER PUBLICATIONS

International Search Report of PCT Application No. PCT/JP2019/039294 dated Dec. 24, 2019.

(Continued)

*Primary Examiner* — Darren E Wolf

(57) ABSTRACT

An object is to respectively provide excitations light from a plurality of light sources to an odd number of fiber pairs. Optical amplifiers are disposed in three fiber pairs including two optical fibers through which optical signals are transmitted, respectively. The optical multiplexer/demultiplexer has inputs connected to light sources and three outputs. An optical multiplexer/demultiplexer has inputs connected to light sources and three outputs. In optical multiplexers/demultiplexers, one input is alternatively connected to any one of the three outputs of the optical multiplexer/demultiplexer, the other input is alternatively connected to any one of the three outputs of the optical multiplexer/demultiplexer, one output is alternatively connected to one optical fiber of any one of the three pairs, and the other output is alternatively connected to the other optical fiber of any one of the three pairs.

7 Claims, 5 Drawing Sheets

(56) References Cited

U.S. PATENT DOCUMENTS

| | | | |
|---|---|---|---|
| 2002/0012161 A1* | 1/2002 | Tsuzaki | H04B 10/2916 359/334 |
| 2002/0105716 A1 | 8/2002 | Tanaka et al. | |
| 2002/0109906 A1* | 8/2002 | Grubb | H04B 10/2935 359/334 |
| 2002/0122242 A1* | 9/2002 | Shimojoh | H04B 10/298 359/334 |
| 2004/0042064 A1 | 3/2004 | Shieh et al. | |
| 2005/0226622 A1 | 10/2005 | Trischitta et al. | |
| 2005/0259316 A1* | 11/2005 | Stephens | H04B 10/2525 359/334 |
| 2006/0061855 A1 | 3/2006 | Sugaya | |
| 2006/0140633 A1 | 6/2006 | Chaput | |
| 2013/0222890 A1* | 8/2013 | Sakauchi | H01S 3/094061 359/337.11 |
| 2019/0052390 A1 | 2/2019 | Mikami | |
| 2019/0348812 A1 | 11/2019 | Kawai | |

FOREIGN PATENT DOCUMENTS

| | | |
|---|---|---|
| JP | 2002232362 A | 8/2002 |
| JP | 2004104473 A | 4/2004 |
| JP | 2006084882 A | 3/2006 |
| JP | 2010200361 A | 9/2010 |
| JP | 2013123205 A | 6/2013 |
| WO | 2017056438 A1 | 4/2017 |
| WO | 2018097074 A1 | 5/2018 |
| WO | 2018097075 A1 | 5/2018 |
| WO | 2019/176205 A1 | 9/2019 |

OTHER PUBLICATIONS

Extended European Search Report for EP Application No. 19874394.0 dated Nov. 8, 2021.

* cited by examiner

OPTICAL REPEATER AND OPTICAL SIGNAL RELAY METHOD

This application is a National Stage Entry of PCT/JP2019/039294 filed on Oct. 4, 2019, which claims priority from Japanese Patent Application 2018-196827 filed on Oct. 18, 2018, the contents of all of which are incorporated herein by reference, in their entirety.

TECHNICAL FIELD

The present invention relates to an optical repeater and an optical signal relay method.

BACKGROUND ART

In an optical communication system such as a submarine optical cable system, a DWDM (Dense Wavelength-Division Multiplexing) system is used to secure transmission capacity. In this system, an optical repeater is inserted into an optical transmission line to compensate for attenuation of an optical signal transmitted through the optical transmission line. As an optical amplifier used in the optical repeater, an erbium-doped fiber amplifier (EDFA) capable of directly amplifying the optical signal is known. Since the EDFA amplifies the optical signal by being excited by excitation light, the optical repeater is configured to provide the EDFA with the excitation light.

As a configuration for providing the excitation light, a configuration for Raman amplifying an optical signal transmitted through a fiber optical transmission line having the EDFA is known (PTL1). In this configuration, a Raman excitation light having a plurality of wavelengths is time-divided for each wavelength by a WDM coupler and coupled to the optical transmission line. Thus, the Raman excitation light corresponding to the wavelength of the optical signal transmitted through the optical transmission line can be provided in a time-division manner.

It is also known that the excitation light of the EDFA is provided to each of four optical transmission lines in which the EDFA is disposed (PTL2). In this configuration, the excitation light output from one light source is coupled to each of the four optical transmission lines by an excitation light distribution circuit having a variable distribution ratio. Thus, the intensity of the excitation light provided to each of the four optical transmission lines can be controlled.

Furthermore, a configuration in which the excitation lights output from a plurality of light sources are distributed to a plurality of optical transmission lines in which the EDFA is disposed (PTL3) is known. In this configuration, an optical star coupler multiplexes a plurality of the excitation lights and demultiplexes the multiplexed light into a plurality of the excitation lights. As a result, when the wavelengths of the excitation lights are different, it is possible to correspond to different gains, and when the wavelengths of the excitation lights are the same, even if a part of the light sources fails, the other light sources can compensate.

CITATION LIST

Patent Literature

PTL1: Japanese Patent Application Publication No. 2006-84882
PTL2: Japanese Patent Application Publication No. 2013-123205
PTL3: Japanese Patent Application Publication No. 11-243369

SUMMARY OF INVENTION

Technical Problem

In a submarine optical network system, an upstream optical transmission line and a downstream optical transmission line are generally provided as a pair (Fiber pair). Therefore, in an optical repeater used in the submarine optical network system, two light sources for outputting excitation lights to two optical transmission lines are provided per fiber pair. The optical repeater has a redundant configuration in which two lights output from the two light sources are multiplexed, and two excited lights obtained by demultiplexing the multiplexed light into two lights are output to the two optical transmission lines. Thus, even if one light source fails, the other light source can output the excitation light to the two optical transmission lines. Thus, although the light intensity of the excitation light decreases, it is possible to provide the EDFA with the excitation light.

Further, it has been considered to achieve a redundant configuration in which a larger number of light sources are disposed to provide a larger number of fiber pairs with the excitation light. Thus, the reliability of the optical repeater can be further improved when the light source fails. When the number of the fiber pairs is an even number, a redundant configuration can be achieved by using an even number of light sources and a two-input/two-output optical coupler (See, e.g., FIG. 5).

However, when the number of the fiber pairs is odd, an optimum redundant configuration cannot be achieved by the two-input/two-output optical coupler. Therefore, the number of the fiber pairs is limited to the even number due to the restriction of the redundant configuration. Further, for example, when only a two-input/two-output optical coupler is used, as described above, the excitation light is provided to the even number of the fiber pairs by the even number of the light sources and the two-input/two-output optical coupler, and the remaining one fiber pair cannot be made redundant, or it is necessary to use another optical amplifier other than the EDFA.

PTLs 1 and 2 do not assume that the excitation light is provided to an odd number of fiber pairs. Further, in PTL 3, although an optical star coupler can distribute an arbitrary number of lights to an arbitrary number of optical fibers, a specific configuration of the optical star coupler is unknown. Furthermore, as the number of light sources and the number of optical fibers increase, the structure of the optical star coupler may become complicated, and it is difficult to apply the optical star coupler to the optical repeater of the submarine optical network system in which miniaturization is essential.

An object of the present invention is to provide an optical repeater having a redundant configuration for respectively providing excitation lights from a plurality of light sources to an odd number of fiber pairs.

Solution to Problem

An aspect of the present invention is an optical repeater including: a plurality of light sources configured to output excitation lights; optical amplifiers respectively disposed in N pairs of two optical transmission lines, where N is an odd number equal to or greater than three, and configured to amplify optical signals transmitted through the optical transmission lines by using the excitation light; a first optical multiplexer/demultiplexer having inputs connected to a part of the plurality of the light sources and having N outputs; a second optical multiplexer/demultiplexer having inputs connected to the light sources in the plurality of the light sources other than the light sources connected to the first optical multiplexer/demultiplexer and having N outputs; and N third optical multiplexers/demultiplexers, one input of the third optical multiplexer/demultiplexer is alternatively connected to any one of the N outputs of the first optical multiplexer/demultiplexer, the other input of the third optical multiplexer/demultiplexer is alternatively connected to any one of the N outputs of the second optical multiplexer/demultiplexer, one output of the third optical multiplexer/demultiplexer is alternatively connected to one optical transmission line of any one of the N pairs, the other output of the third optical multiplexer/demultiplexer is alternatively connected to the other optical transmission line of any one of the N pairs.

An aspect of the present invention is an optical signal relay method comprising: multiplexing excitation lights output from a part of a plurality of light sources, and demultiplexing the multiplexed light into N first lights, where N is an odd number equal to or greater than three; multiplexing the excitation lights output from the light sources other than the part of the plurality of the light sources, and demultiplexing the multiplexed light into N second lights; multiplexing one first light alternatively selected from the N first lights and one second light alternatively selected from the N second lights, and demultiplexing the multiplexed light into two lights; and outputting the two demultiplexed lights to the one pair alternatively selected from the N pairs comprising the two optical transmission lines through which the optical signals are transmitted, in which optical amplifiers are respectively disposed in the two optical transmission lines of the N pairs, the optical amplifier being configured to amplify a transmitted optical signal by using the excitation light, one of the two demultiplexed lights is input as the excitation light to the optical amplifier disposed in one of the optical transmission lines of the selected pair, and the other of the two demultiplexed lights is input as the excitation light to the optical amplifier disposed in the other of the optical transmission lines of the selected pair.

Advantageous Effects of Invention

According to the present invention, it is possible to provide an optical repeater having a redundant configuration for respectively providing excitation lights from a plurality of light sources to an odd number of fiber pairs.

DESCRIPTION OF EMBODIMENTS

Hereinbelow, example embodiments of the present disclosure are explained with reference to the drawings. The same symbols are assigned to the same elements throughout the drawings and duplicated explanations are omitted as necessary.

First Example Embodiment

Figure 1:
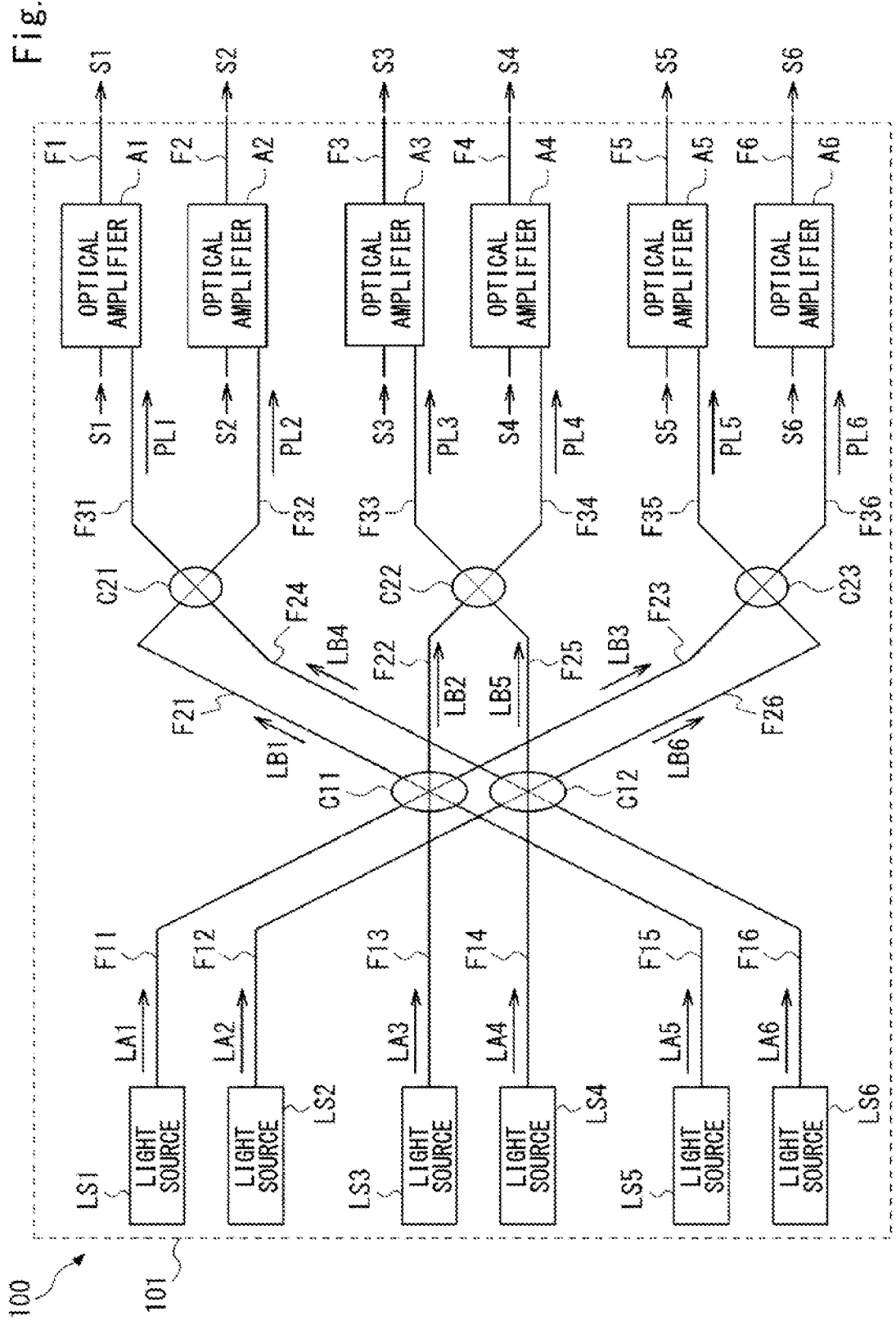
FIG. 1 is a diagram schematically showing a configuration of an optical repeater according to a first example embodiment.
Figure 2:
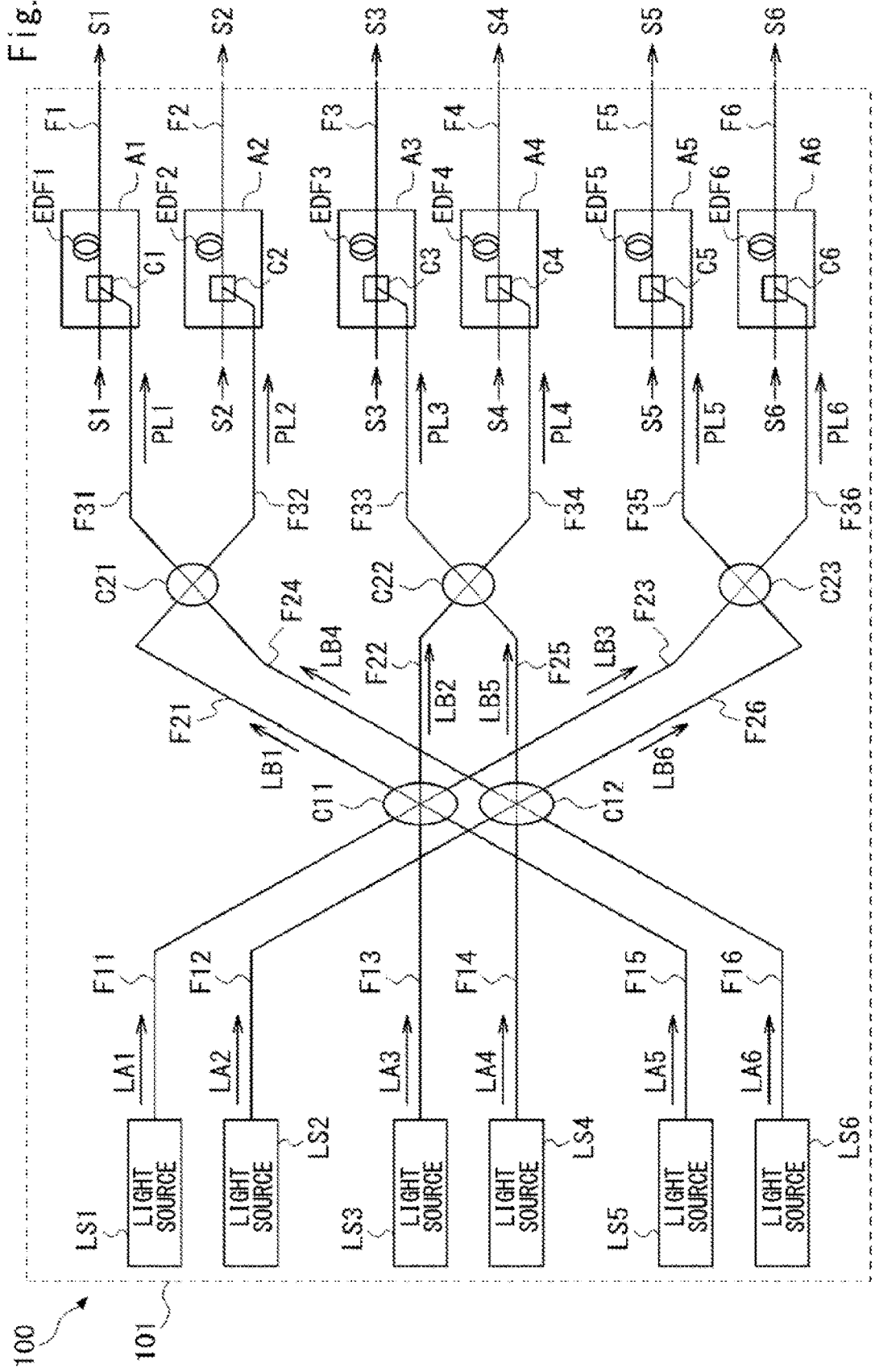
FIG. 2 is a diagram showing the configuration of the optical repeater according to the first example embodiment in more detail.

An optical repeater according to a first example embodiment will be described. The optical repeater according to the first example embodiment is configured as a submarine optical repeater that relays an optical signal transmitted through a submarine optical fiber cable, for example. FIG. 1 schematically shows a configuration of an optical repeater 100 according to the first example embodiment. FIG. 2 shows the configuration of the optical repeater 100 according to the first example embodiment in more detail.

The optical repeater is configured as an optical repeater provided to amplify an optical signal transmitted through a transmission line including optical fibers F1 to F6. The optical fibers F1 to F6 constitute three fiber pairs of two optical fibers. Specifically, the optical fibers F1 and F2 constitute one fiber pair, the optical fibers F3 and F4 constitute one fiber pair, and the optical fibers F5 and F6 constitute one fiber pair. For example, the optical fibers F1, F3, and F5 are for uplink communication (UP), and the optical fibers F2, F4, and F6 are for downlink communication (DOWN).

The optical repeater 100 includes light sources LS1 to LS6, optical multiplexers/demultiplexers C11, C12, C21 to C23, and optical amplifiers A1 to A6. The light sources LS1 to LS6, the optical multiplexers/demultiplexers C11, C12, C21 to C23, and the optical amplifiers A1 to A6 constitute a housing unit 101 that houses the three fiber pairs (Optical fibers F1 to F6).

In the present example embodiment, the optical multiplexer/demultiplexer C11 (Also referred to as a first optical multiplexer/demultiplexer) and the optical multiplexer/demultiplexer C12 (Also referred to as a second optical multiplexer/demultiplexer) are configured as a three-input/three-output coupler. Each of the optical multiplexers/demultiplexers C11 and C12 multiplexes lights input from three input ports, demultiplexes the multiplexed light into three lights of equal intensity, and respectively outputs the demultiplexed lights from three output ports. The optical multiplexers/demultiplexers C21 to C23 (Also respectively referred to as third optical multiplexers/demultiplexers) are configured as a two-input/two-output coupler. Each of the optical multiplexers/demultiplexers C21 to C23 multiplexes lights input from two input ports, demultiplexes the multiplexed light into two lights of equal intensity, and respectively outputs the demultiplexed lights from two output ports.

The light sources LS1, LS3, and LS5 are alternatively connected to the three input ports of the optical multiplexer/demultiplexer C11 through optical fibers F11, F13, and F15, respectively. As a result, the light sources LS1, LS3, and LS5 output lights LA1, LA3, and LA5 that are excitation lights to the three input ports of the optical multiplexer/demultiplexer C11, respectively. The lights LA1, LA3, and LA5 are multiplexed by the optical multiplexer/demultiplexer C11 and then demultiplexed, and lights LB1 to LB3 (Also respectively referred to as first lights) are output from the three output ports, respectively.

The three output ports of the optical multiplexer/demultiplexer C11 are alternatively connected to one input ports of the optical multiplexers/demultiplexers C21 to C23 through optical fibers F21 to F23, respectively. Thus, from the three output ports of the optical multiplexer/demultiplexer C11 to the optical multiplexers/demultiplexers C21 to C23, the lights LB1 to LB3 are output, respectively.

The light sources LS2, LS4, and LS6 are alternatively connected to the three input ports of the optical multiplexer/demultiplexer C12 through optical fibers F12, F14, and F16, respectively. Thus, the light sources LS2, LS4, and LS6 output lights LA2, LA4, and LA6 that are excitation lights to the three input ports of the optical multiplexer/demultiplexer C12, respectively. The lights LA2, LA4, and LA6 are multiplexed by the optical multiplexer/demultiplexer C12 and then demultiplexed, and lights LB4 to LB6 (Also respectively referred to as second lights) are output from the three output ports, respectively.

The three output ports of the optical multiplexer/demultiplexer C12 are alternatively connected to one input ports of the optical multiplexer/demultiplexer C21 to C23 through optical fibers F24 to F26, respectively. Thus, from the three output ports of the optical multiplexer/demultiplexer C12 to the optical multiplexers/demultiplexers C21 to C23, the lights LB4 to LB6 are output, respectively.

The optical multiplexer/demultiplexer C21 demultiplexes a signal obtained by multiplexing the light LB1 output from the optical multiplexer/demultiplexer C11 and the light LB4 output from the optical multiplexer/demultiplexer C12 into two lights to output excitation lights PL1 and PL2. The optical multiplexer/demultiplexer C22 demultiplexes a signal obtained by multiplexing the light LB2 output from the optical multiplexer/demultiplexer C11 and the light LB5 output from the optical multiplexer/demultiplexer C12 into two lights to output excitation lights PL3 and PL4. The optical multiplexer/demultiplexer C23 demultiplexes a signal obtained by multiplexing the light LB3 output from the optical multiplexer/demultiplexer C11 and the light LB6 output from the optical multiplexer/demultiplexer C12 into two lights to output excitation lights PL5 and PL6.

The optical amplifiers A1 to A6 directly amplify optical signals S1 to S6 transmitted through the optical fibers F1 to F6 using the excitation lights PL1 to PL6, respectively. The optical amplifiers A1 to A6 are configured as optical amplifiers such as an erbium-doped optical fiber amplifier.

The optical amplifiers A1 to A6 include optical multiplexers/demultiplexers C1 to C6 and erbium-doped fiber optical amplifiers EDF1 to EDF6, respectively. The optical multiplexers/demultiplexers C1 to C6 are inserted into the optical fibers F1 to F6 and alternatively connected to optical fibers F31 to F36, respectively.

The optical multiplexer/demultiplexer C1 of the optical amplifier A1 is connected to one output port of the optical multiplexer/demultiplexer C21 through the optical fiber F31, and the excitation light PL1 is input thereto. The optical multiplexer/demultiplexer C2 of the optical amplifier A2 is connected to the other output port of the optical multiplexer/demultiplexer C21 through the optical fiber F32, and the excitation light PL2 is input thereto. The optical multiplexer/demultiplexer C3 of the optical amplifier A3 is connected to one output port of the optical multiplexer/demultiplexer C22 through the optical fiber F33, and the excitation light PL3 is input thereto. The optical multiplexer/demultiplexer C4 of the optical amplifier A4 is connected to the other output port of the optical multiplexer/demultiplexer C22 through the optical fiber F34, and the excitation light PL4 is input thereto. The optical multiplexer/demultiplexer C5 of the optical amplifier A5 is connected to one output port of the optical multiplexer/demultiplexer C23 through the optical fiber F35, and the excitation light PL5 is input thereto. The optical multiplexer/demultiplexer C6 of the optical amplifier A6 is to the other output port of the optical multiplexer/demultiplexer C23 connected through the optical fiber F36, and the excitation light PL6 is input thereto.

According to the present configuration, the excitation lights PL1 to PL6 are input to the optical multiplexers/demultiplexers C1 to C6 through the optical fibers F31 to F36, and coupled to the optical fibers F1 to F6, respectively. Thus, the erbium-doped fiber optical amplifiers EDF1 to EDF6 are excited by the excitation lights PL1 to PL6 and the optical signals S1 to S6 are amplified, respectively. The amplified optical signals S1 to S6 are output to optical components in a subsequent stage through the optical fibers F1 to F6 or are transmitted to a repeater other than the optical repeater 100 or a base station.

Next, the light intensities of the lights LA1 to LA6, the lights LB1 to LB6, and the excitation lights PL1 to PL6 will be described.

Here, it is assumed that the light intensities of the lights LA1 to LA6 are "1". In this case, the lights LA1, LA3, and LA5 input to the optical multiplexer/demultiplexer C11 are multiplexed, and the intensity of the multiplexed light becomes "3". The multiplexed light is demultiplexed into the three lights of equal intensity and the demultiplexed lights are output as the lights LB1 to LB3. Therefore, the respective light intensities of the lights LB1 to LB3 become "1". In other words, each of the lights LB1 to LB3 includes ⅓ of each of the lights LA1, LA3, and LA5.

Further, the lights LA2, LA4, and LA6 input to the optical multiplexer/demultiplexer C12 are multiplexed, and the intensity of the multiplexed light becomes "3". The multiplexed light is demultiplexed into the three lights of equal intensity and the demultiplexed lights are output as the lights LB4 to LB6. Therefore, the respective light intensities of the lights LB4 to LB6 become "1". In other words, each of the lights LB4 to LB6 includes ⅓ of each of the lights LA2, LA4, and LA6.

The lights LB1 and LB4 input to the optical multiplexer/demultiplexer C21 are multiplexed, and the intensity of the multiplexed light becomes "2". The multiplexed light is demultiplexed into the two lights of equal intensity and output as excitation lights PL1 and PL2. Therefore, the respective light intensities of the excitation lights PL1 and PL2 become "1". In other words, each of the excitation lights PL1 and PL2 includes ⅙ of each of the lights LA1 to LA6.

The lights LB2 and LB5 input to the optical multiplexer/demultiplexer C22 are multiplexed, and the intensity of the multiplexed light becomes "2". The multiplexed light is demultiplexed into the two lights of equal intensity and the demultiplexed lights are output as the excitation lights PL3 and PL4. Therefore, the respective light intensities of the excitation lights PL3 and PL4 become "1". In other words, each of the excitation lights PL3 and PL4 includes ⅙ of each of the lights LA1 to LA6.

The lights LB3 and LB6 input to the optical multiplexer/demultiplexer C23 are multiplexed, and the intensity of the multiplexed light becomes "2". The multiplexed light is demultiplexed into the two lights of equal intensity and the demultiplexed lights are output as the excitation lights PL5 and PL6. Therefore, the respective light intensities of the excitation lights PL5 and PL6 become "1". In other words, each of the excitation lights PL5 and PL6 includes ⅙ of each of the lights LA1 to LA6.

As described above, the lights LA1 to LA6 are multiplexed and distributed by a light distribution unit, so that the excitation lights PL1 to PL6 uniformly include the lights LA1 to LA6 (⅙ each), respectively.

The present configuration has a redundant configuration in which the excitation light uniformly including the lights output from a plurality of light sources is provided to the optical amplifier in the optical transmission line of each fiber pair. Therefore, even if a part of the light source fails, although the light intensity of the excitation light decreases, the output of the excitation light to the optical amplifier is not interrupted. For example, in the present configuration, when one light source fails, although the light intensity of the excitation light becomes ⅚, the output of the excitation light to the optical amplifier can be continued. Therefore, according to the present configuration, it is possible to provide the optical repeater that can continue relaying the optical signal even if the light source fails.

Further, in the above present configuration, the redundant configuration can be achieved by a simple configuration in which the two three-input/three-output optical multiplexers/demultiplexers C11 and C12 and the three two-input/two-output optical multiplexers/demultiplexers C21 to C23 are combined. Therefore, it possible to achieve the redundant configuration in which the excitation light can be easily provided to an odd number of fiber pairs.

In the present configuration, although an example having three fiber pairs has been described, it is also possible to adopt a configuration in which the excitation light is provided to an odd-numbered of fiber pairs of five or more.

That is, the configuration of the optical repeater and the housing unit can be expressed in a generalized manner as follows. When the excitation light is provided to N (N is an odd number equal to or greater than three) fiber pairs, two N-input/N-output optical multiplexers (corresponding to the optical multiplexers/demultiplexers C11 and C12) may be disposed for multiplexing lights output from N/2 light sources and demultiplexing the multiplexed light into N lights. Further, N two-input/two-output optical multiplexers/demultiplexers (corresponding to the optical multiplexers/demultiplexers C21 to C23) may be disposed for multiplexing lights output from both the two N-input/N-output optical multiplexers/demultiplexers and output two excitation lights obtained by demultiplexing the multiplexed light to corresponding fiber pairs.

Second Example Embodiment

Figure 3:
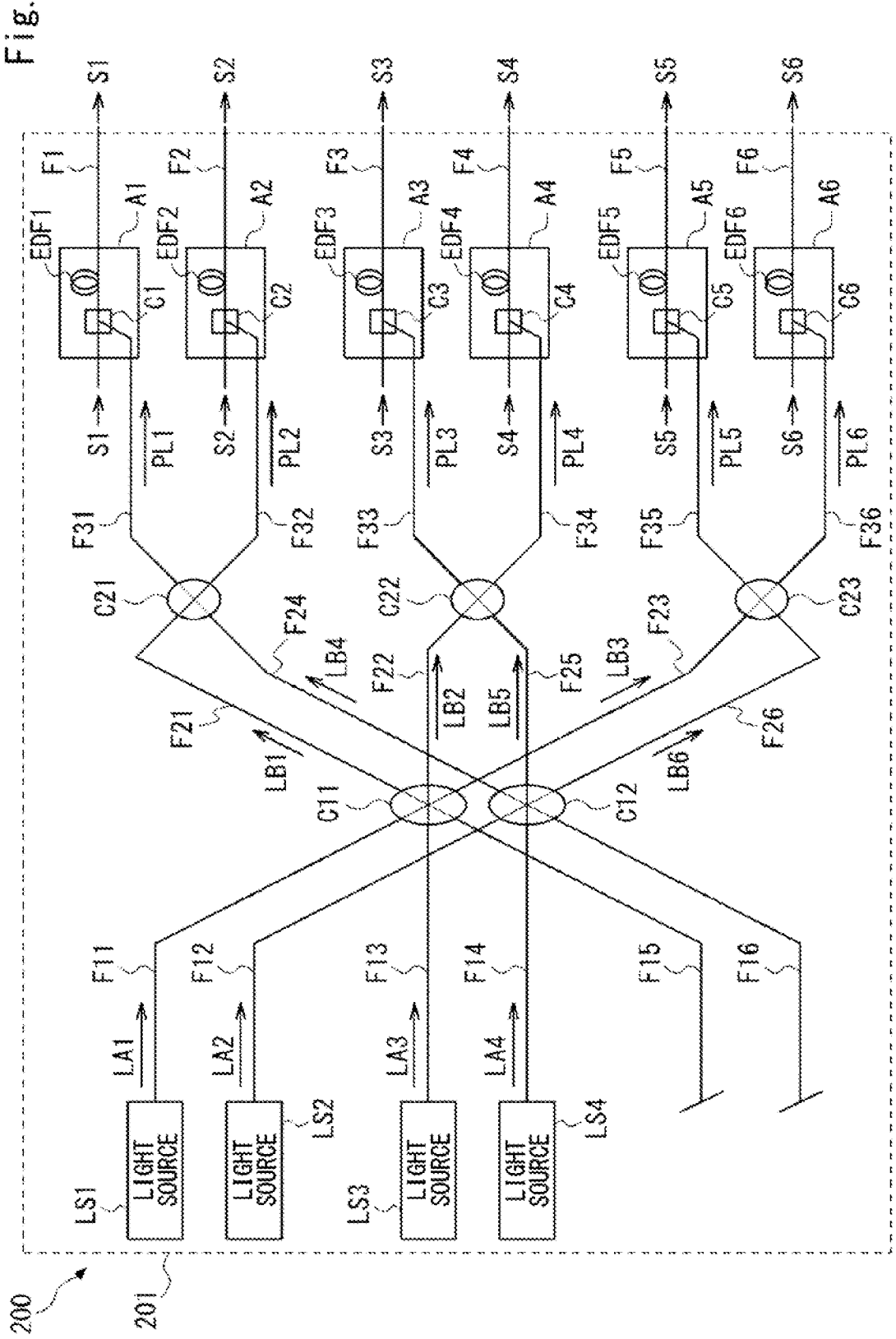
FIG. 3 is a diagram schematically showing a configuration of an optical repeater according to a second example embodiment.

An optical repeater according to a second example embodiment will be described. The optical repeater according to the second example embodiment is a modification of the optical repeater according to the first example embodiment. FIG. 3 schematically shows a configuration of an optical repeater 200 according to the second example embodiment. The optical repeater 200 has a configuration in which the light sources LS5 and LS6 of the optical repeater 100 are removed. The light sources LS1 to LS4, the optical multiplexers/demultiplexers C11, C12, and C21 to C23, and the optical amplifiers A1 to A6 constitute a housing unit 201 for housing three fiber pairs (Optical fibers F1-F6).

The optical repeater 200 has two fewer light sources than the optical repeater 100. Therefore, the respective light intensities of the excitation lights PL1 to PL6 become "⅘". Thus, even if the number of the light sources connected to the three-input/three-output coupler is reduced in accordance with the application, the excitation light can be provided to each fiber pair, although the light intensity of the excitation light decreases.

Although the number of the light sources is twice as many as the number of the fiber pairs in the first example embodiment, it can be understood that the number of the light sources is not limited to twice as many as the number of the fiber pairs as described in the present example embodiment.

Third Example Embodiment

An optical repeater according to a third example embodiment will be described. The optical repeater according to the third example embodiment is configured as an optical repeater capable of housing more fiber pairs than the optical repeater 100 according to the first example embodiment.

When the number of the fiber pairs is large, the redundant configuration in which the excitation light is provided to the even number of fiber pairs using the two-input/two-output coupler as described above, and the redundant configuration in which the excitation light is provided to the odd number of fiber pairs according to the first example embodiment may be combined. Thus, the excitation light can be provided to the odd number of fiber pairs. For example, the excitation light may be provided to N fiber pairs by the redundant configuration according to the present configuration, and the excitation light may be provided to M (M is an even number equal to or greater than three two) fiber pairs by a general redundant configuration using only two-input/two-output couplers. In this case, it is possible to provide an optical repeater having a redundant configuration for providing the excitation light to any (N+M) fiber pairs.

Figure 4:
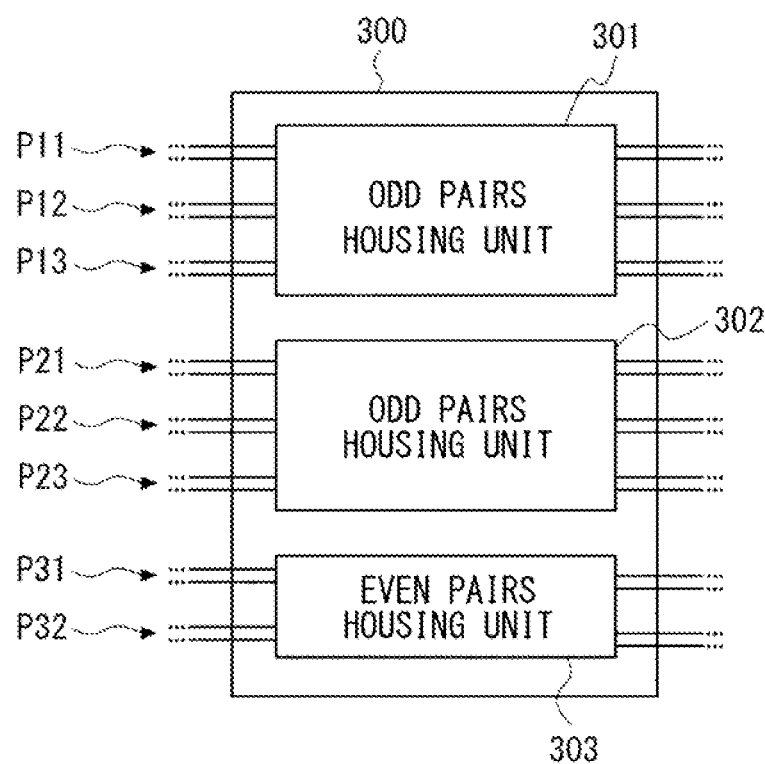
FIG. 4 is a diagram schematically showing a configuration of an optical repeater according to a third example embodiment.

FIG. 4 schematically shows a configuration of an optical repeater 300 according to the third example embodiment. The optical repeater 300 has, as an example, a configuration for housing eight fiber pairs (N=3*2, M=2), and includes two odd pairs housing units 301 and 302, and one even pairs housing unit 303.

The odd pairs housing units 301 and 302 have a configuration similar to that of the housing unit 101 of the optical repeater 100 and houses three fiber pairs. The odd pairs housing unit 301 houses a fiber pair P11 (corresponding to the pair of the optical fibers F1 and F2), a fiber pair P12 (corresponding to the pair of optical fibers F3 and F4), and a fiber pair P13 (corresponding to the pair of optical fibers F5 and F6). The odd pairs housing unit 302 houses a fiber pair P21 (corresponding to the pair of the optical fibers F1 and F2), a fiber pair P22 (corresponding to the pair of the optical fibers F3 and F4, and a fiber pair P23 (corresponding to the pair of the optical fibers F5 and F6). The even pairs housing unit 303 houses two fiber pairs P31 and P32.

Figure 5:
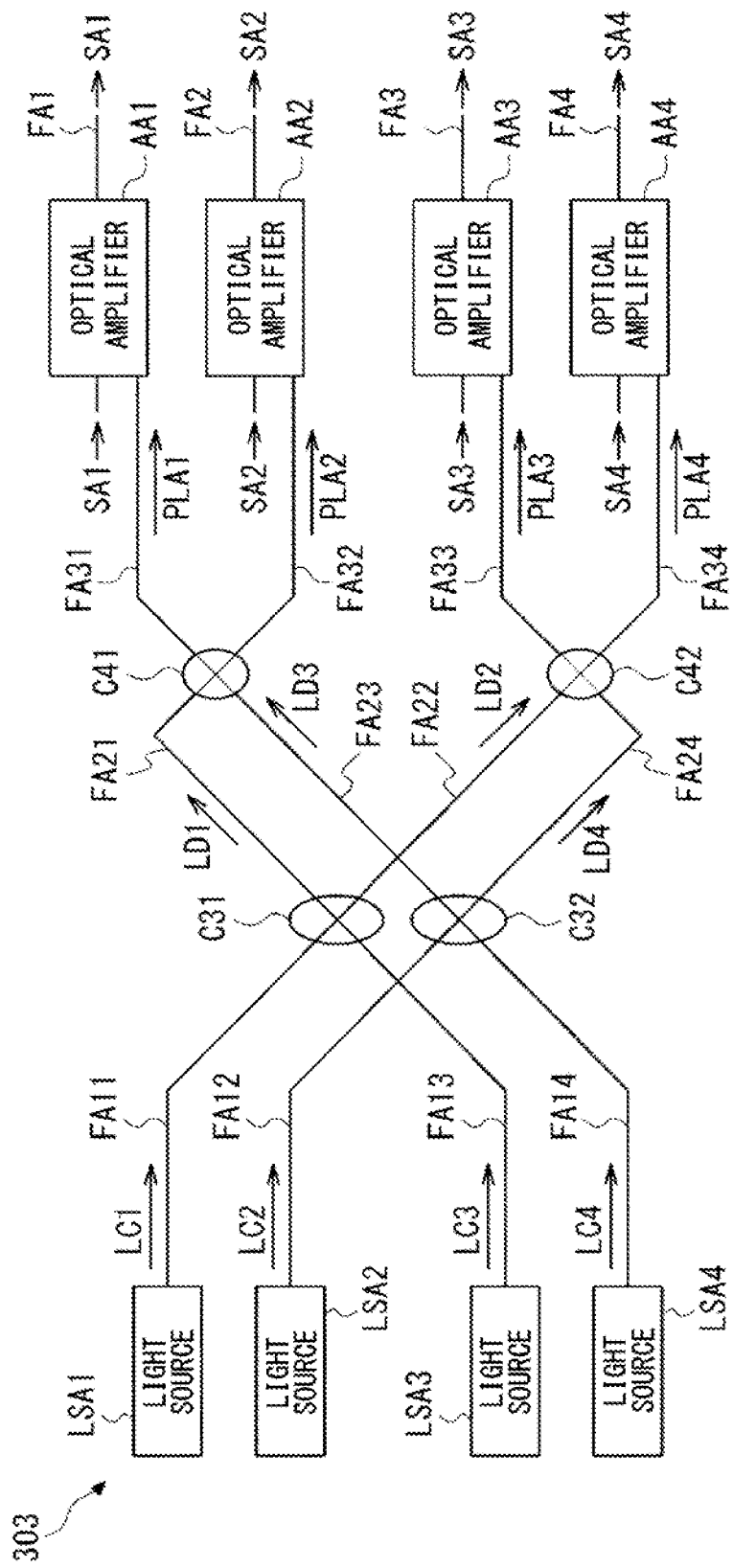
FIG. 5 is a diagram schematically showing a configuration of an even pairs housing unit according to the third example embodiment.

Hereinafter, the even pairs housing unit 303 will be described. FIG. 5 schematically shows a configuration of the even pairs housing unit 303 according to the third example embodiment. The even pairs housing unit 303 includes light sources LSA1 to LSA4, optical multiplexers/demultiplexers C31, C32, C41, and C42, and optical amplifiers AA1 to AA4.

The optical multiplexers/demultiplexers C31, C32, C41, and C42 are configured as a two-input/two-output coupler. Each of the optical multiplexers/demultiplexers C31, C32, C41, and C42 multiplexes lights input from two input ports, demultiplexes the multiplexed light into two lights of equal intensity, and respectively outputs the demultiplexed lights from two output ports.

The light source LSA1 and the light source LSA3 are alternatively connected to two input ports of the optical multiplexer/demultiplexer C31 (Also referred to as a fourth optical multiplexer/demultiplexer) through optical fibers FA11 and FA13, respectively. Thus, the light sources LSA1 and LSA3 output the lights LC1 and LC3 to the two input ports of the optical multiplexer/demultiplexer C31, respectively. The lights LC1 and LC3 are multiplexed and then demultiplexed by the optical multiplexer/demultiplexer C31, and the lights LD1 and LD2 are output from the two output ports, respectively.

The two output ports of the optical multiplexer/demultiplexer C31 are alternatively connected to one input ports of the optical multiplexers/demultiplexers C41 and C42 (Also referred to as sixth optical multiplexers/demultiplexers, respectively) through optical fibers FA21 and FA22, respectively. Thus, the lights LD1 and LD2 are output from the two output ports of the optical multiplexer/demultiplexer C31 to the optical multiplexers/demultiplexers C41 and C42, respectively.

The light sources LSA2 and LSA4 are alternatively connected to two input ports of the optical multiplexer/demultiplexer C32 (Also referred to as a fifth optical multiplexer/demultiplexer) through optical fibers FA12 and FA14, respectively. Thus, the light sources LSA2 and LSA4 output the lights LC2 and LC4 to the two input ports of the optical multiplexer/demultiplexer C32, respectively. The lights LC2 and LC4 are multiplexed and then demultiplexed by the optical multiplexer/demultiplexer C32, and the lights LD3 and LD4 are output from two output ports, respectively.

The two output ports of the optical multiplexer/demultiplexer C32 are alternatively connected to the other input ports of the optical multiplexers/demultiplexers C41 and C42 through optical fibers FA23 and FA24, respectively. Thus, the lights LD3 and LD4 are output from the two output ports of the optical multiplexer/demultiplexer C32 to the optical multiplexers/demultiplexers C41 and C42, respectively.

The optical multiplexer/demultiplexer C41 demultiplexes a signal obtained by multiplexing the light LD1 output from the optical multiplexer/demultiplexer C31 and the light LD3 output from the optical multiplexer/demultiplexer C42 into two light to output excitation lights PLA1 and PLA2 through optical fibers FA31 and FA32. The optical multiplexer/demultiplexer C42 demultiplexes a signal obtained by multiplexing the light LD2 output from the optical multiplexer/demultiplexer C31 and the light LD4 output from the optical multiplexer/demultiplexer C42 into two lights to output excitation lights PLA3 and PLA4 through the optical fibers FA33 and FA34.

The optical amplifiers AA1 to AA4 directly amplify optical signals SA1 to SA4 transmitted through optical fibers FA1 to FA4 using the excitation lights PLA1 to PLA4, respectively. A pair of the optical fibers FA1 and FA2 corresponds to the fiber pair P31, and a pair of the optical fibers FA3 and FA4 corresponds to the fiber pair P32. The optical amplifiers AA1 to AA4 are configured as an optical amplifier such as an erbium-doped optical fiber amplifier, for example. The optical amplifiers AA1 to AA4 have the same configuration as the optical amplifiers A1 to A4 according to the first example embodiment, and the detailed description thereof will be omitted.

Next, the light intensities of the lights LC1 to LC4, the lights LD1 to LD4, and the excitation lights PLA1 to PLA4 will be described. Here, it is assumed that the light intensities of the lights LC1 to LC4 are "1". In this case, the lights LC1 and LC3 input to the optical multiplexer/demultiplexer C31 are multiplexed, and the intensity of the multiplexed light becomes "2". The multiplexed light is demultiplexed into the two lights of equal intensity and the demultiplexed lights are output as the lights LD1 and LD2. Therefore, the respective light intensities of the lights LD1 and LD2 become "1". In other words, each of the lights LD1 and LD2 includes ½ of each of the lights LC1 and LC3.

Further, the lights LC2 and LC4 input to the optical multiplexer/demultiplexer C32 are multiplexed, and the intensity of the multiplexed light becomes "2". The multiplexed light is demultiplexed into the two lights of equal intensity and the demultiplexed lights are output as the lights LD3 and LD4. Therefore, the respective light intensities of the lights LD3 and LD4 become "1". In other words, each of the lights LD3 and LD4 includes ½ of each of the lights LC2 and LC4.

The lights LD1 and LD3 input to the optical multiplexer/demultiplexer C41 are multiplexed, and the intensity of the multiplexed light becomes "2". The multiplexed light is demultiplexed into the two lights of equal intensity and the demultiplexed lights are output as the excitation lights PLA1 and PLA2. Therefore, the respective light intensities of the excitation lights PLA1 and PLA2 become "1". In other words, each of the excitation lights PLA1 and PLA2 includes ¼ of each of the lights LC1 to LC4.

The lights LD2 and LD4 input to the optical multiplexer/demultiplexer C42 are multiplexed, and the intensity of the multiplexed light becomes "2". The multiplexed light is demultiplexed into the two lights of equal intensity and the demultiplexed lights are output as the excitation lights PLA3 and PLA4. Therefore, the respective light intensities of the excitation lights PLA3 and PLA4 become "1". In other words, each of the excitation lights PLA3 and PLA4 includes ¼ of each of the lights LC1 to LC4.

As described above, since the lights LC1 to LC4 are multiplexed and then demultiplexed by the optical multiplexer/demultiplexer, each of the excitation lights PLA1 to PLA4 uniformly includes the lights LC1 to LC4 (¼ each).

The even pairs housing unit 303 has a redundant configuration in which the excitation light uniformly including the lights output from a plurality of light sources are provided to the optical amplifier in the optical transmission lines of each fiber pair. Therefore, even if a part of the light sources fails, the output of the excitation light to the optical amplifier is not interrupted, although the light intensity of the excitation light decreases. For example, in the present configuration, when one light source fails, although the light intensity of the excitation light becomes ¾, the output of the excitation light to the optical amplifier can be continued. Therefore, according to the present configuration, it is possible to provide the optical repeater that can continue relaying the optical signal even if the light source fails.

As described above, it can be understood that the optical repeater 300 has the configuration in which each of the odd pairs housing units 301 and 302 houses the three fiber pairs, and the even pair housing unit 303 houses the two fiber pairs.

In the case of an optical repeater disposed on the seabed, the number of fiber pairs that can be housed in the optical repeater is about eight in practice. In this case, by using the configuration of the optical repeater 300, it is possible to preferably house the eight fiber pairs.

Although the even pairs housing unit 303 has been described as housing two fiber pairs, it is also possible to provide the excitation light to the even number of fiber pairs of four or more.

That is, the configuration of the even pairs housing unit can be expressed in a generalized manner as follows. When the excitation light is provided to M (M is an even number greater than or equal to two) fiber pairs, two M-input/M-output optical multiplexers/demultiplexers (corresponding to the optical multiplexers/demultiplexers C31 and C32) may be disposed for multiplexing the lights output from M/2 light sources and demultiplexing the multiplexed light into M lights. Further, M two-input/two-output optical multiplexers/demultiplexers (corresponding to the optical multiplexers/demultiplexers C41 and C42) may be provided for multiplexing the lights output from both the two M-input/M-output optical multiplexers/demultiplexers and outputting two excitation lights obtained by demultiplexing the multiplexed light to corresponding fiber pairs.

In the present example embodiment, although the configuration in which the two odd pairs housing units and one even pairs housing unit are provided has been described, the number of the odd pairs housing units may be any number, and the number of the even pairs housing units may be any number. Further, as described in the first example embodiment, the number of the fiber pairs housed in the odd pairs housing unit may be any odd number other than three.

Other Example Embodiments

Note that the present disclosure is not limited to the example embodiments mentioned above and can be modified as appropriate without departing from the gist of the present disclosure. For example, in the above-described example embodiments, although a plurality of components provided in the optical repeater are connected by the optical fibers, this is merely an example. A part or all of the optical fibers connecting a plurality of components provided in the optical repeater may be replaced with an optical waveguide other than the optical fiber.

In the third example embodiment described above, although the odd pairs housing units 301 and 302 have the same configuration as the housing unit 101, both or one of the odd pairs housing units 301 and 302 may have the same configuration as the housing unit 201.

In the above-described example embodiments, although the multiplexers/demultiplexers C11, C12, and C21 to C23 demultiplex the multiplexed light into the lights of equal intensity, the multiplexed light may be demultiplexed at a non-uniform ratio corresponding to the intensity of the excitation light required by the optical amplifiers of the fiber pairs.

It should be appreciated that a manufacturing method of the optical repeater according to the above-described example above can be achieved by arranging the light source and the optical amplifier described in the above example embodiments and arranging the optical distributor. It should be appreciated that an optical signal relay method can be achieved by applying the optical repeater to amplify the optical signal.

If the light source fails in the optical repeater according to the above-described example embodiment, the light intensity of the light output from the non-failed light source may be increased within an allowable range to maintain the light intensity of the excitation light. In this case, a control unit may be provided in the optical repeater, and the control unit may detect a failure of the light source and control the light source which is not failed.

In the above-described example embodiment, the erbium-doped fiber amplifier (EDFA) has been described as an example of a fiber-type optical amplifier in which a rare earth element is added to a core. However, this is merely an example, and a fiber-type optical amplifier in which other rare earth elements other than erbium (Er) such as Nd (Neodymium), Yb (Ytterbium), Pr (Praseodymium), Ce (Cerium), Sm (Samarium), Tm (Thulium) and La (Lanthanum) are added to the core may be applied.

In the above-described example embodiment, although a plurality of light sources are provided, the wavelengths of lights output from the light sources are not particularly limited. That is, the wavelengths of the lights output from the light sources may be the same, or the wavelengths of the lights output from some or all of the light sources may be different.

Although the optical repeater according to the above-described example embodiment has been described as being used in the submarine optical network system, the application of the optical repeater is not limited to this. For example, it may be used in a land-based optical network system other than the submarine optical network system.

The present disclosure has been described above with reference to the example embodiments, however, the present disclosure is not to be limited to the aforementioned disclosure. The configuration and the details of the present disclosure can be modified in various ways within the scope that is understandable by a person skilled in the art.

This application is based upon and claims the benefit of priority from Japanese patent application No. 2018-196827, filed on Oct. 18, 2018, the disclosure of which is incorporated herein in its entirety by reference.

REFERENCE SIGNS LIST

100, 200, 300 OPTICAL REPEATERS
101, 201 HOUSING UNITS
301, 302 ODD PAIRS HOUSING UNITS
303 EVEN PAIRS HOUSING UNIT
A1 TO A6, AA1 TO AA4 OPTICAL AMPLIFIERS
C1 TO C6, C11, C12, C21 TO C23, C31, C32, C41, C42 OPTICAL MULTIPLEXERS/DEMULTIPLEXERS
EDF1 TO EDF6 ERBIUM-DOPED FIBER OPTICAL AMPLIFIERS
F1 TO F6, F11 TO F16, F21 TO F26, F31 TO F36, FA1 TO FA4, FA11 TO FA14, FA21 TO FA24, FA31 TO FA34 OPTICAL FIBERS
LA1 TO LA6, LB1 TO LB6, LC1 TO LC4, LD1 TO LD4 LIGHTS
LS1 TO LS6, LSA1 TO LSA4 LIGHT SOURCES
PL1 TO PL6, PLA1 TO PLA4 EXCITATION LIGHTS
S1 TO S6, SA1 TO SA4 OPTICAL SIGNALS

What is claimed is:

1. An optical repeater comprising:
a plurality of light sources configured to output excitation lights;
optical amplifiers respectively disposed in N pairs of two optical transmission lines, where N is an odd number equal to or greater than three, and configured to amplify optical signals transmitted through the optical transmission lines by using the excitation light;
a first optical multiplexer/demultiplexer having inputs connected to a part of the plurality of the light sources and having N outputs;
a second optical multiplexer/demultiplexer having inputs connected to the light sources in the plurality of the light sources other than the light sources connected to the first optical multiplexer/demultiplexer and having N outputs; and
N third optical multiplexers/demultiplexers, wherein one input of each of the N third optical multiplexers/demultiplexers is connected to a corresponding one of the N outputs of the first optical multiplexer/demultiplexer, the other input of each of the N third optical multiplexers/demultiplexers is connected to a corresponding one of the N outputs of the second optical multiplexer/demultiplexer, a first output of each of the N third optical multiplexers/demultiplexers is connected to one optical transmission line in each of the N pairs of transmission lines, and a second other output of the N third optical multiplexers/demultiplexers is connected to the other optical transmission line in each of the N pairs of transmission lines.

2. The optical repeater according to claim 1, wherein the first optical multiplexer/demultiplexer is connected to one half of the plurality of the light sources, and the second optical multiplexer/demultiplexer is connected to the other half of the plurality of the light sources other than those connected to the first optical multiplexer/demultiplexer.

3. The optical repeater according to claim 1, wherein a part or all of the first to third optical multiplexers/demultiplexers multiplexes input lights, demultiplexes the multiplexed light into lights of the same intensity, and outputs the demultiplexed lights.

4. The optical repeater according to claim 1, wherein the plurality of light sources is equal to or less than 2N.

5. The optical repeater according to claim 1, wherein N is 3.

6. The optical repeater according to claim 1, further comprising:

one or more first housing units configured to house the N pairs comprising the plurality of the light sources, the optical amplifiers, the first and second optical multiplexers/demultiplexers, and the N third optical multiplexers/demultiplexers; and one or more second housing units configured to house M pairs comprising two optical transmission lines through which optical signals are transmitted, where M is an even number greater than or equal to two, wherein the second housing unit comprises:

a plurality of light sources configured to output excitation lights;

optical amplifiers respectively disposed in the M pairs and amplify the optical signals transmitted through the optical transmission lines by using the excitation light;

a fourth optical multiplexer/demultiplexer having inputs connected to a part of the plurality of the light sources and having M outputs;

a fifth optical multiplexer/demultiplexer having inputs connected to the light sources in the plurality of the light sources other than the those connected to the fourth optical multiplexer/demultiplexer and having M outputs; and M sixth optical multiplexers/demultiplexers, wherein one input of each of the N sixth optical multiplexers/demultiplexers is connected to a corresponding one of the M outputs of the fourth optical multiplexer/demultiplexer, the other input of each of the N sixth optical multiplexers/demultiplexers is connected to a corresponding one of the M outputs of the fifth optical multiplexer/demultiplexer, a first output of each of the N sixth optical multiplexers/demultiplexers is connected to one optical transmission line in each of the M pairs of transmission lines, and a second output of each of the N sixth optical multiplexers/demultiplexers is connected to the other optical transmission line in each of the M pairs of transmission lines.

7. An optical signal relay method comprising:

multiplexing excitation lights output from a part of a plurality of light sources, and demultiplexing the multiplexed light into N first lights, where N is an odd number equal to or greater than three;

multiplexing the excitation lights output from the light sources other than the part of the plurality of the light sources, and demultiplexing the multiplexed light into N second lights;

multiplexing each first light that is a corresponding one of the N first lights and each second light that is a corresponding one of the N second lights, and demultiplexing the multiplexed light into two demultiplexed lights that form a demultiplexed light pair; and outputting each demultiplexed light pair to a corresponding one pair selected from the N pairs of two optical transmission lines through which optical signals are transmitted, the two demultiplexed lights in each demultiplexed light pair being input to the two optical transmission line in the corresponding pair of two optical transmission lines, respectively, wherein optical amplifiers are respectively disposed in the two optical transmission lines of the N pairs, the optical amplifier is configured to amplify a transmitted optical signal by using the excitation light, one of the two demultiplexed lights is input as the excitation light to the optical amplifier disposed in one of the optical transmission lines of the selected pair, and the other of the two demultiplexed lights is input as the excitation light to the optical amplifier disposed in the other of the optical transmission lines of the selected pair.

* * * * *